US008803054B2

(12) United States Patent
Saito et al.

(10) Patent No.: US 8,803,054 B2
(45) Date of Patent: Aug. 12, 2014

(54) APPARATUS, FOCUS DETECTION APPARATUS, AND IMAGE PICKUP SYSTEM (75) Inventors: Kazuhiro Saito, Chofu (JP); Tomohisa Kinugasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 682 days.

(21) Appl. No.: 12/966,364

(22) Filed: Dec. 13, 2010

(65) Prior Publication Data
US 2011/0139967 A1 Jun. 16, 2011

(30) Foreign Application Priority Data

Dec. 16, 2009 (JP) ................................ 2009-285778

(51) Int. Cl.
*G02B 27/64* (2006.01)
(52) U.S. Cl.
USPC .............. 250/201.2; 250/201.4; 250/214 AG; 250/216; 348/345
(58) Field of Classification Search
USPC ......... 250/201.2, 201.4, 214.1, 214 AG, 216; 348/345
See application file for complete search history.

(56) References Cited

U.S. PATENT DOCUMENTS

| 6,781,624 | B1 | 8/2004 | Takahashi |
| 7,812,876 | B2 * | 10/2010 | Hiyama et al. ............... 348/300 |
| 2003/0058047 | A1 * | 3/2003 | Sakurai ........................ 330/253 |
| 2003/0146995 | A1 * | 8/2003 | Takahashi et al. ........... 348/308 |
| 2005/0270264 | A1 * | 12/2005 | Kokubun et al. ............... 345/98 |
| 2008/0002958 | A1 * | 1/2008 | Inoue et al. ..................... 396/96 |

FOREIGN PATENT DOCUMENTS

| CN | 1711753 A | 12/2005 |
| CN | 1805508 A | 7/2006 |
| CN | 101097288 A | 1/2008 |
| CN | 101123671 A | 2/2008 |
| JP | 2000-050164A A | 2/2000 |
| JP | 2000-180706 A1 | 6/2000 |
| JP | 2003-051989A A | 2/2003 |
| JP | 2003-163843A A | 6/2003 |

* cited by examiner

*Primary Examiner* — Georgia Y Epps
*Assistant Examiner* — Kevin Wyatt
(74) *Attorney, Agent, or Firm* — Canon U.S.A., Inc., IP Division (57) ABSTRACT In a photoelectric conversion apparatus, an error can occur due to a voltage drop through a MOS transistor. In the photoelectric conversion apparatus, to reduce the error, a circuit block disposed between a unit pixel and an output line includes a differential amplifier circuit and a switch that is disposed in a feedback path of the differential amplifier circuit.

17 Claims, 8 Drawing Sheets

|  | AGC PERIOD | SIGNAL READING PERIOD |
|---|---|---|
| BP1 | BIAS ON | CUT OFF |
| BN1 | CUT OFF | CUT OFF |
| BN_AGC | BIAS ON | CUT OFF |
| BP2 | BIAS ON | BIAS ON |
| BP3 | CUT OFF | BIAS ON |
| BP_AGC | BIAS ON | CUT OFF |

|        | OFFSET CANCELING PERIOD | AGC PERIOD | SIGNAL READING PERIOD |
|--------|-------------------------|------------|-----------------------|
| BP1    | BIAS ON                 | BIAS ON    | CUT OFF               |
| BN1    | BIAS ON                 | CUT OFF    | CUT OFF               |
| BN_AGC | CUT OFF                 | BIAS ON    | CUT OFF               |
| BP2    | BIAS ON                 | BIAS ON    | BIAS ON               |
| BP3    | BIAS ON                 | CUT OFF    | BIAS ON               |
| BP_AGC | CUT OFF                 | BIAS ON    | CUT OFF               |

APPARATUS, FOCUS DETECTION APPARATUS, AND IMAGE PICKUP SYSTEM

BACKGROUND OF THE INVENTION

1. Field of the Invention

The present invention relates to a photoelectric conversion apparatus, and more particularly, to a photoelectric conversion apparatus including a circuit configured to detect a maximum value and a minimum value.

2. Description of the Related Art

An AF (Auto Focusing) sensor is known to use a photoelectric conversion apparatus configured to output a maximum value and a minimum value of signals output from an array of photoelectric conversion units. Japanese Patent Laid-Open No. 2000-180706 discloses an AF sensor having a signal processing apparatus that allows a reduction in noise.

There may be a need for a further improvement in accuracy of AF sensors. To meet this need, the AF sensor tends to have a greater number of pixels. However, in the technique disclosed in Japanese Patent Laid-Open No. 2000-180706, if the number of pixels is increased, the result is an increase in the number of MOS transistors connected to a common output line and an increase in current used to drive the common output line.

When a maximum value or a minimum value is detected, an error among pixels can occur due to a voltage drop caused by resistance of each MOS transistor connected to the common output line and a current that drives the common output line. More specifically, in a configuration disclosed in FIG. 1 of Japanese Patent Laid-Open No. 2000-180706, an image signal from each photoelectric conversion unit is output via a minimum-value-detection differential amplifier 11. The minimum-value-detection differential amplifier 11 is configured in the form of a voltage follower, and an output terminal thereof is connected to the common output line via a transistor 13 disposed between the differential amplifier and the common output line. When a signal is output from the minimum-value-detection differential amplifier 11 to the common output line, a voltage drop occurs via the transistor 13 disposed between the differential amplifier and the common output line. If there is a difference in characteristics among the transistors 13 due to a variation in a production process, a variation of the voltage drop occurs, which may produce an error. The error increases with increasing current that drives the common output line.

SUMMARY OF THE INVENTION

According to an aspect of the present invention, there is provided an apparatus including a plurality of unit pixels each configured to output a signal generated by photoelectric conversion, an output line commonly provided for the plurality of unit pixels and configured to transmit signals output from the unit pixels, and a plurality of circuit blocks each disposed for one of the unit pixels and connected between the one of the unit pixels and the common output line, wherein each of the circuit blocks includes a differential amplifier circuit and a first switch, the differential amplifier circuit has a non-inverting input terminal to which the signal output from a corresponding unit pixel is applied, the differential amplifier circuit has an output terminal connected to a first terminal of the first switch, and a second terminal of the first switch is connected to the common output line and an inverting input terminal of the differential amplifier circuit.

Further features of the present invention will become apparent from the following description of exemplary embodiments with reference to the attached drawings.

DESCRIPTION OF THE EMBODIMENTS

First Embodiment

A first embodiment of the present invention is described below with reference to the accompanying drawings. In the first embodiment, a photoelectric conversion apparatus is configured for use as a phase-difference auto focus (AF) detector.

Figure 1:
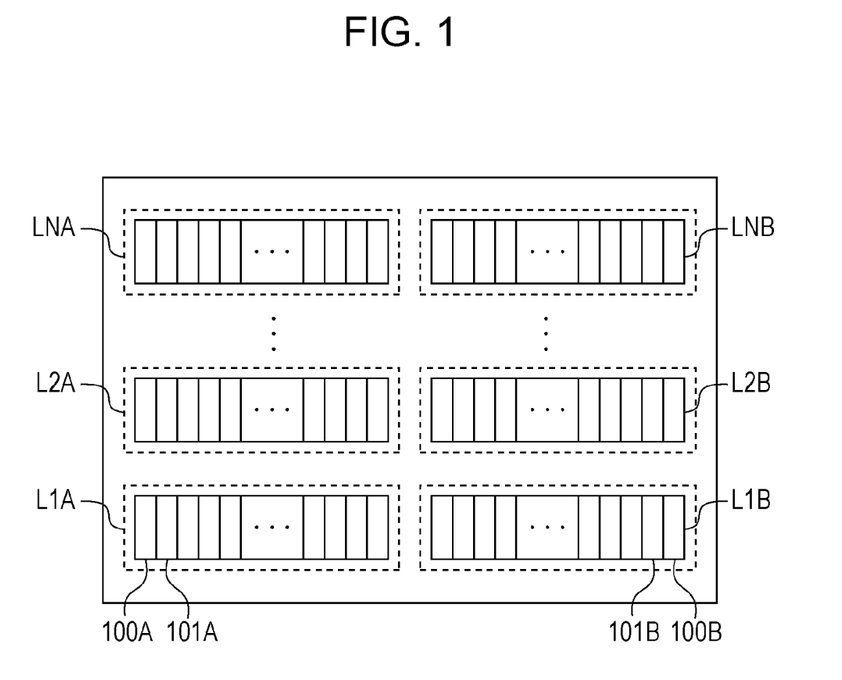
FIG. 1 is a diagram schematically illustrating an imaging plane of a photoelectric conversion apparatus for use in a phase difference auto focus operation according to an embodiment of the present invention.

FIG. 1 is a diagram schematically illustrating an imaging plane of the photoelectric conversion apparatus for use in the phase-difference auto focus operation. In the imaging plane, a pair of line sensor units L1A and L1B, a pair of line sensor units L2A and L2B, . . . , and a pair of line sensor units LNA and LNB are formed. These pairs of line sensor units are used to detect an amount of defocus (a deviation from an in-focus point) of an image of a subject in a particular area of the imaging plane. The provision of a plurality of pairs of line sensor units makes it possible to detect the amount of defocus at a plurality of points whereby it becomes possible to achieve an improvement in AF accuracy. Each line sensor unit includes unit pixels 100, 101, and so on.

Figure 2A:
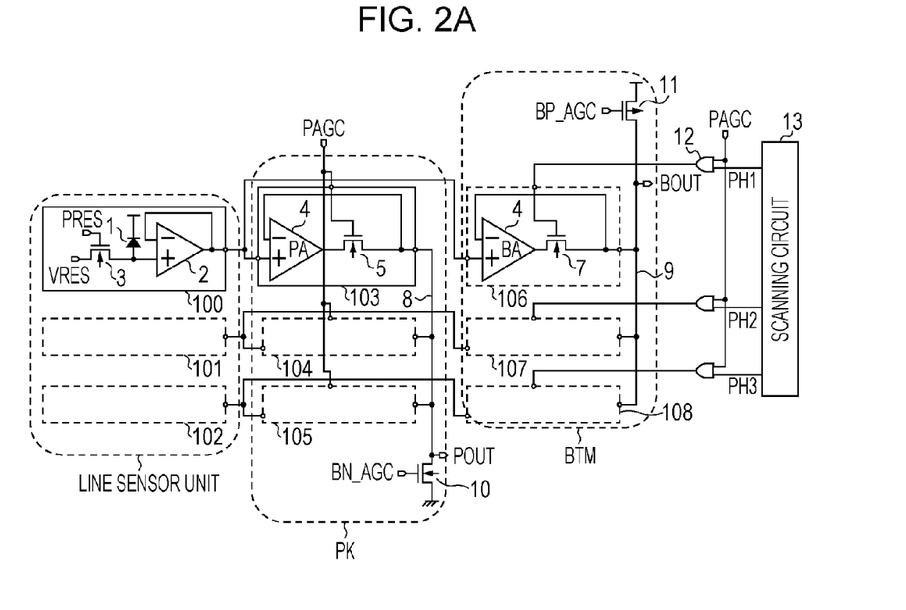
FIGS. 2A to 2C are circuit diagrams illustrating examples of configurations of a photoelectric conversion apparatus according to an embodiment of the present invention.

FIG. 2A is a circuit diagram illustrating details of the configuration of one line sensor unit. For simplicity of illustration, it is assumed that the line sensor unit includes three unit pixels. Unit pixels 101 and 102 are similar in configuration to a unit pixel 100, circuit blocks 104 and 105 are similar in configuration to a circuit block 103, and circuit blocks 107 and 108 are similar in configuration to a circuit block 106, and thus the figure is illustrated in a simplified manner. A common output line 8 and a common output line 9 are each for common use by a plurality of unit pixels such that signals output from the unit pixels are transmitted via the common output line 8 and the common output line 9.

A unit pixel 100 includes a photodiode (PD) 1 serving as a photoelectric conversion unit, an operational amplifier 2 serving as a pixel amplification unit, and a reset MOS transistor 3 serving as a pixel reset unit to reset an anode of the PD 1 and a non-inverting input terminal of the operational amplifier 2. A cathode of the PD 1 is connected to a power supply voltage VDD, and the anode of the PD 1 is connected to one of main electrodes of the reset MOS transistor 3 and the non-inverting input terminal of the operational amplifier 2. The operational amplifier 2 is configured to function as a voltage follower whose output terminal is connected to an inverting input terminal thereof, and a signal from a unit pixel is output from the output terminal of the operational amplifier 2. The other one of the main electrodes of the reset MOS transistor 3 is connected to a power supply voltage VRES.

An output terminal of the unit pixel 100 is connected to a maximum value detection unit PK and a minimum value detection unit BTM. The maximum value detection unit PK includes circuit blocks 103 to 105 and a constant current source 10. The minimum value detection unit BTM includes circuit blocks 106 to 108 and a constant current source 11.

The circuit block 103 includes a differential amplifier circuit 4 and a MOS transistor 5. A non-inverting input terminal of the differential amplifier circuit 4 is connected to the output terminal of the unit pixel, and an output terminal of the differential amplifier circuit 4 is connected to one of main electrodes of a MOS transistor 5 serving as a first switch. The other one of the main electrodes of the MOS transistor 5 is connected to the common output line 8 and an inverting input terminal of the differential amplifier circuit 4. The MOS transistor 5 turns on or off in response to a signal PAGC supplied to a control electrode of the MOS transistor 5. Note that a CMOS switch or the like may be used instead of the MOS transistor 5. Such a switch realized by the MOS transistor 5 or the CMOS switch is generically referred to as a maximum value output switch.

The circuit block 106 includes a differential amplifier circuit 6 and a MOS transistor 7. A non-inverting input terminal of the differential amplifier circuit 6 is connected to the output terminal of the unit pixel. An output terminal of the differential amplifier circuit 6 is connected to an inverting input terminal of the differential amplifier circuit 6 via a MOS transistor 7 serving as a first switch. The MOS transistor 7 turns on or off in response to a signal output from an OR gate 12. More specifically, the MOS transistor 7 turns on when the signal PAGC or a signal PH1 supplied from a scanning circuit 13 is at a high level. Similarly, when a signal PH2 or signal PH3 is at a high level, a corresponding MOS transistor disposed in the circuit block 107 or 108 turns on. Note that a CMOS switch or the like may be used instead of the MOS transistor 7. Such a switch realized by the MOS transistor 7 or the CMOS switch is generically referred to as a minimum value output switch.

Figure 2B:
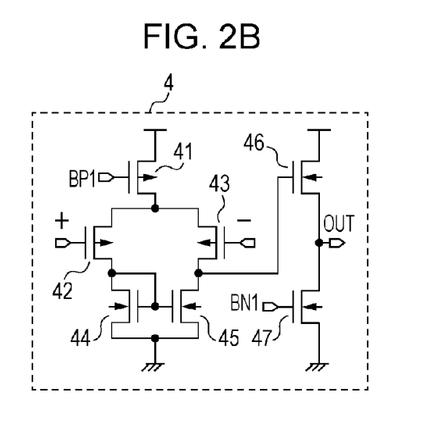

FIG. 2B is a circuit diagram illustrating an example of a further detailed configuration of the differential amplifier circuit 4. The differential amplifier circuit 4 includes PMOS transistors 41 to 43 and NMOS transistors 44 to 47. The differential amplifier circuit 4 is divided into two stages, i.e., a differential input stage and a buffer stage. In the differential input stage including MOS transistors 41 to 45, a MOS transistor 42 functions as a non-inverting input terminal, while a MOS transistor 43 functions as an inverting input terminal. A current flowing through the differential input stage changes depending on a conduction state of a MOS transistor 41, which is controlled by a signal BP1. The buffer stage includes MOS transistors 46 and 47 that form a source follower. If the MOS transistor 47 serving as a first current source turns on in response to a signal BN1, an output of the differential amplifier circuit 4 is obtained at a terminal OUT.

Figure 2C:
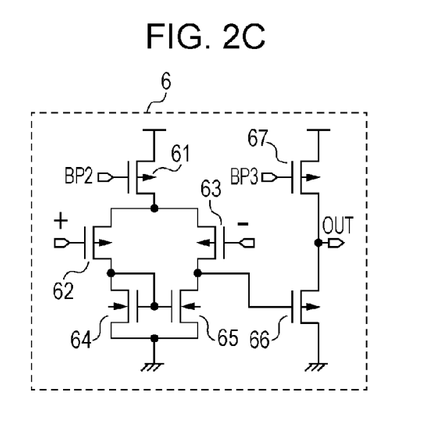

FIG. 2C is a circuit diagram illustrating an example of a further detailed configuration of the differential amplifier circuit 6. The differential amplifier circuit 6 includes PMOS transistors 61 to 63, PMOS transistors 66 and 67, and NMOS transistors 64 and 65. The differential amplifier circuit 6 is divided into two stages, i.e., a differential input stage and a buffer stage. In the differential input stage including MOS transistors 61 to 65, a MOS transistor 62 functions as a non-inverting input terminal, while a MOS transistor 63 functions as an inverting input terminal. A current flowing through the differential input stage changes depending on a conduction state of a MOS transistor 61, which is controlled by a signal BP2. The buffer stage includes MOS transistors 66 and 67 that form a source follower. If the MOS transistor 67 serving as a first constant current source turns on in response to a signal BP3, an output of the differential amplifier circuit 6 is obtained at a terminal OUT.

Figure 3:
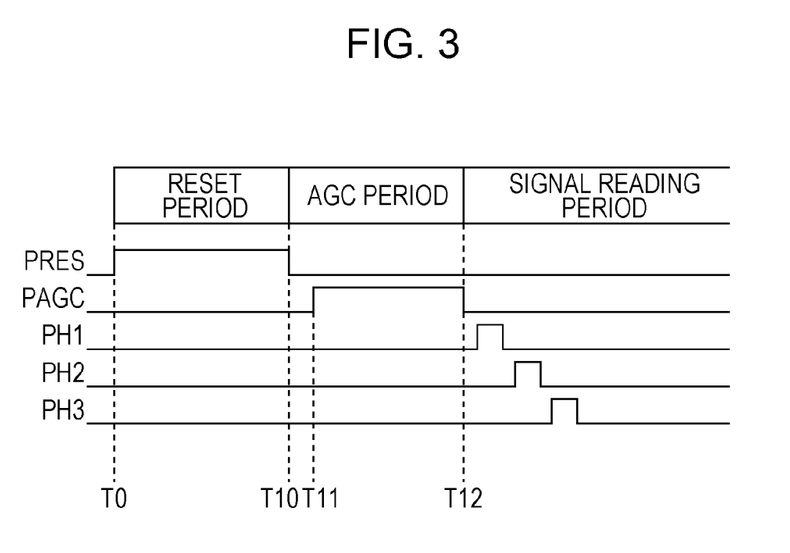
FIG. 3 is a timing chart associated with an operation according to an embodiment of the present invention.
Figure 4:
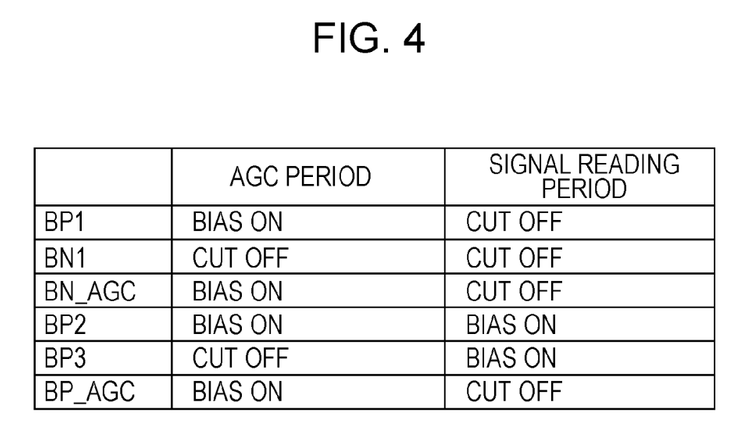
FIG. 4 is a table illustrating states of signals according to an embodiment of the present invention.

Next, an operation of the photoelectric conversion apparatus according to the present embodiment is described below with reference to a timing chart shown in FIG. 3 and a signal-state table shown in FIG. 4. FIG. 3 illustrates levels of signals shown in FIG. 2A. When a signal of these is at a high level, the corresponding MOS transistor turns on, while when a signal is at a low level, the corresponding MOS transistor turns off. FIG. 4 illustrates states of signals shown in FIGS. 2A, 2B and 2C. More specifically, "BIAS ON" indicates that a corresponding MOS transistor is in an ON state, and "CUT OFF" indicates that a corresponding MOS transistor is in an OFF state or a state in which a current flowing through the MOS transistor is limited compared with a current flowing through the MOS transistor in the "BIAS ON" state.

As shown in FIG. 3, the operation is divided into three periods, i.e., a reset period, an AGC period, and a signal reading period.

First, in the reset period that starts at time T0, the signal PRES is switched to a high level to initialize the PD1 and the non-inverting input terminal of the operational amplifier 2. In the reset period, the signals BP1 to BP3, BN1, BN_AGC and BP_AGC may be in any state. However, if these signals are all in the "CUT OFF" state, a reduction in power consumption is achieved.

In the AF sensor, an operation called an automatic gain control (AGC) operation is performed. In the AGC operation, the signal output from the line sensor unit is monitored, and a gain for the signal is controlled according to the magnitude of the signal. During the AGC period that starts at time T10, to perform the AGC operation, the signal output from the unit pixel is monitored by a signal processing unit (not shown). More specifically, a difference between a maximum value signal output from an output terminal POUT and a minimum value signal output from an output terminal BOUT is monitored, and the gain of the signal is controlled depending on the magnitude of the difference.

When the signal PRES is switched to a low level at time T10, a signal corresponding to an amount of light incident on the PD1 is output from the unit pixel.

During the AGC period, the signals BN1 and BP3 are in the "CUT OFF" state, while the signals BP1, BP2, BN_AGC and BP_AGC are in the "BIAS ON" state. During this period, the constant current source in the buffer stage disposed in each of the circuit blocks 103 to 105 is provided not by the MOS transistor 47 but, instead, by a MOS transistor 10 serving as a second constant current source. Thus, when the signal PAGC is switched to the high level at time T11, an output from a circuit block that has the greatest signal input to the control electrode of the MOS transistor 46 among all circuit blocks is obtained at the output terminal POUT of the maximum value detection unit PK. The constant current source in the buffer stage disposed in each of the circuit blocks 106 to 108 is provided not by the MOS transistor 67 but, instead, by the MOS transistor 11 serving as the second constant current source. Thus, an output from a circuit block that has the smallest signal input to the control electrode of the MOS transistor 66 among all circuit blocks is obtained at the output terminal BOUT of the minimum value detection unit BTM. That is, the maximum value and the minimum value of a plurality of signals output from unit pixels in the AGC period are detected, and a contrast of a subject is obtained from the difference between the maximum value and the minimum value.

In the AGC period, the contrast of the subject is detected from the difference between maximum value signal output from the output terminal POUT and the minimum value signal output from the output terminal BOUT, and the gains for these signals are set in a predetermined period of time such that a sufficiently high contrast is obtained. The predetermined period of time may be set depending on an application, a purpose, or the like. By setting this period of time to be shorter, it is possible to reduce a time taken until the gains of signals are changed.

When the signal PAGC is switched to the low level at time T12, the AGC period ends and a signal reading period starts.

In the signal reading period, signals from unit pixels are read out from the output terminal BOUT in response to signals PH1, PH2, . . . , and so on supplied from the scanning circuit 13. For this purpose, only the constant current sources 61 and 67 disposed in the circuit blocks 106 to 108 are in the "BIAS ON" state, and the signals BP1, BN1, BN_AGC, and BP_AGC are set to be in the "CUT OFF" state whereby the MOS transistors 47 and 66 located in the circuit blocks 103 to 108 function as constant current sources of the buffer stages in each circuit block.

In the configuration described above with reference to FIGS. 2A to 2C and FIG. 3, the common output line 8 is connected to the inverting input terminal of the differential amplifier circuit 4, and the common output line 9 is connected to the inverting input terminal of the differential amplifier circuit 6 whereby a virtual ground is created and thus the electric potential of the common output line 8 or 9 becomes equal to the electric potential of the non-inverting input terminal of the differential amplifier circuit 4 or 6. This leads to a reduction of influence of a voltage drop by the MOS transistor 5 or 7 on the signal that is output from the output terminal POUT or BOUT. Thus, the photoelectric conversion apparatus according to the present embodiment of the invention has a reduced error caused by the MOS transistor 5 or 7. In other words, high accuracy is achieved.

Second Embodiment

A second embodiment of the present invention is described below with reference to FIGS. 5 to 7.

In the previous embodiment, the circuit configuration and the operation thereof are discussed in terms of the image signals, and noise that occurs due to initialization of the PD1 and offsets of the differential amplifier circuits 4 and 6 are ignored. However, an actual photoelectric conversion apparatus has noise that occurs when the PD1 is reset (and thus this type of noise is called reset noise) and also has offsets in the differential amplifier circuits 4 and 6. By reducing these influences, it is possible to improve the accuracy of the photoelectric conversion apparatus.

Figure 5:
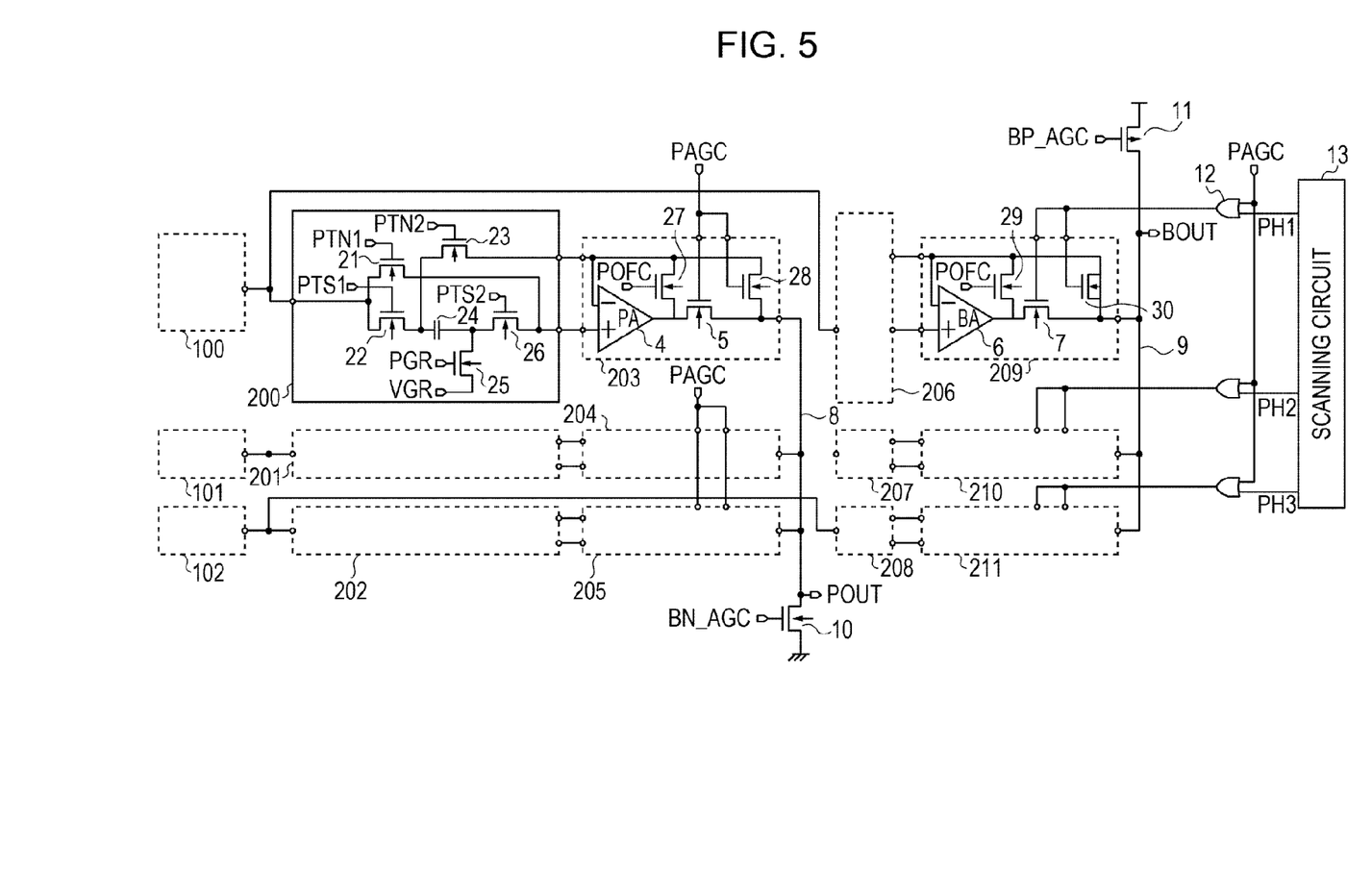
FIG. 5 is a circuit diagram illustrating a configuration of a photoelectric conversion apparatus according to an embodiment of the present invention.

FIG. 5 is a circuit diagram illustrating an example of a configuration of one line sensor unit. For simplicity of illustration, it is assumed that the line sensor unit includes three unit pixels. The configuration is different from that according to the first embodiment in that the line sensor unit additionally includes an offset canceling unit 200, the maximum value detection unit PK additionally includes MOS transistors 27 and 28, and the minimum value detection unit BTM additionally includes MOS transistors 29 and 30. In FIG. 5, units, elements, signals, etc. similar to those in the first embodiment are denoted by similar reference numerals.

The offset canceling unit 200 includes MOS transistors 21, 22, 23, 25, and 26 and a clamping capacitor 24. One of main electrodes of the MOS transistor 21 and one of main electrodes of the MOS transistor 22 are both connected to an output terminal of a unit pixel 100. The other one of the main electrodes of the MOS transistor 21 is connected to one of main electrodes of the MOS transistor 26 and a non-inverting input terminal of a differential amplifier circuit 4. The other one of the main electrodes of the MOS transistor 22 is connected to one of main electrodes of the MOS transistor 23 and one of terminals of the clamping capacitor 24. The other one of the main electrodes of the MOS transistor 23 is connected to an inverting input terminal of the differential amplifier circuit 4. The other one of the electrodes of the clamping capacitor 24 is connected to one of main electrodes of the MOS transistor 25 and the other one of the main electrodes of the MOS transistor 26. The other one of the main electrodes of the MOS transistor 25 is connected to a power supply voltage VGR. The MOS transistors 21, 22, 23, 25, and 26 turn on or off in response to signals PTN1, PTS1, PTN2, PGR, and PS2 applied to their control electrode. Offset canceling units 201 and 202, and offset canceling units 206 to 208 are similar in structure to the offset canceling unit 200.

In a circuit block 203 of the maximum value detection unit PK, one of main electrodes of the MOS transistor 28 serving as a second switch is connected to the inverting input terminal of the differential amplifier circuit 4 and one of main electrodes of the MOS transistor 27, while the other one of the main electrodes of the MOS transistor 28 is connected to the other one of the main electrodes of the MOS transistor 5 and the common output line 8. On the other hand, one of main electrodes of the MOS transistor 27 serving as a third switch is connected to the inverting input terminal of the differential amplifier circuit 4, and the other one of the main electrodes of the MOS transistor 27 is connected to one of main electrodes of a MOS transistor 5 serving as a first switch. The MOS transistor 27 turns on or off in response to the signal POFC. The MOS transistor 28 and the MOS transistor 5 both turn on or off in response to the signal PAGC that is applied in common to these two MOS transistors 28 and 5. Circuit blocks 204 and 205 are similar in configuration to the circuit block 203.

In a circuit block 209 of the minimum value detection unit BTM, one of main electrodes of a MOS transistor 30 serving as a second switch is connected to the inverting input terminal of a differential amplifier circuit 6 and one of main electrodes of the MOS transistor 29, while the other one of the main electrodes of the MOS transistor 30 is connected to the other one of the main electrodes of the MOS transistor 7 and the common output line 8. One of main electrodes of the MOS transistor 29 serving as a third switch is connected to an inverting input terminal of the differential amplifier circuit 6, and the other one of the main electrodes of the MOS transistor 29 is connected to one of main electrodes of the MOS transistor 7 serving as a first switch. The MOS transistor 29 turns on or off in response to the signal POFC. The MOS transistor 30 and the MOS transistor 5 turn on or off in response to a signal supplied from an OR gate 12. When the signal PAGC or one of the signals PH1, PH2, and so on supplied from the scanning circuit 13 is at the high level, an output of the OR gate 12 becomes high in level. Circuit blocks 210 and 211 are similar in configuration as the circuit block 209.

Next, an operation of the photoelectric conversion apparatus according to the present embodiment is described below with reference to a timing chart shown in FIG. 6 and a signal-state table shown in FIG. 7. FIG. 6 illustrates levels of signals shown in FIG. 5. When a signal of these is at a high level, a MOS transistor corresponding to the signal turns on, while a signal is at a low level, a MOS transistor corresponding to the signal turns off. FIG. 7 illustrates states of signals shown in FIG. 5. More specifically, "BIAS ON" indicates that a corresponding MOS transistor is in an ON state, and "CUT OFF" indicates that a corresponding MOS transistor is in an OFF state or a state in which a current flowing through the MOS transistor is limited compared with a current flowing through the MOS transistor in the "BIAS ON" state.

Figure 6:
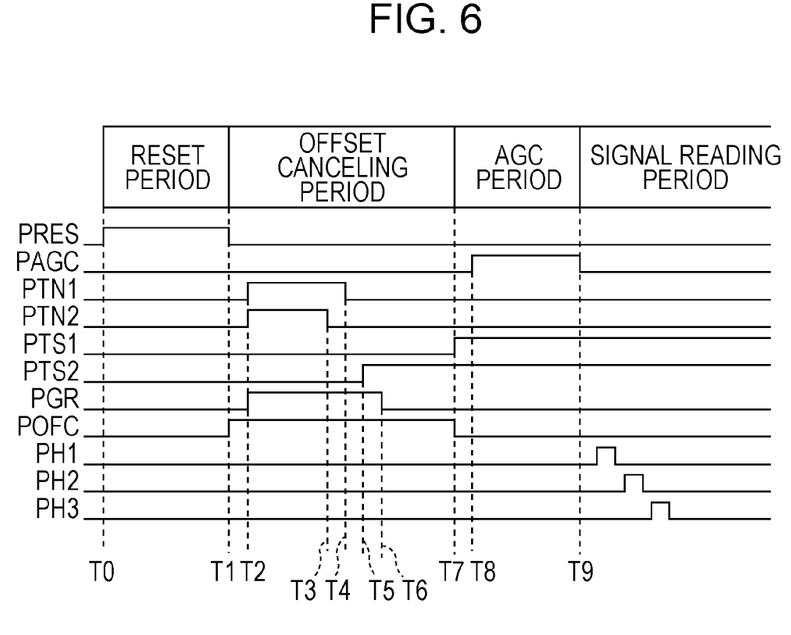
FIG. 6 is a timing chart associated with an operation according to an embodiment of the present invention.
Figure 7:
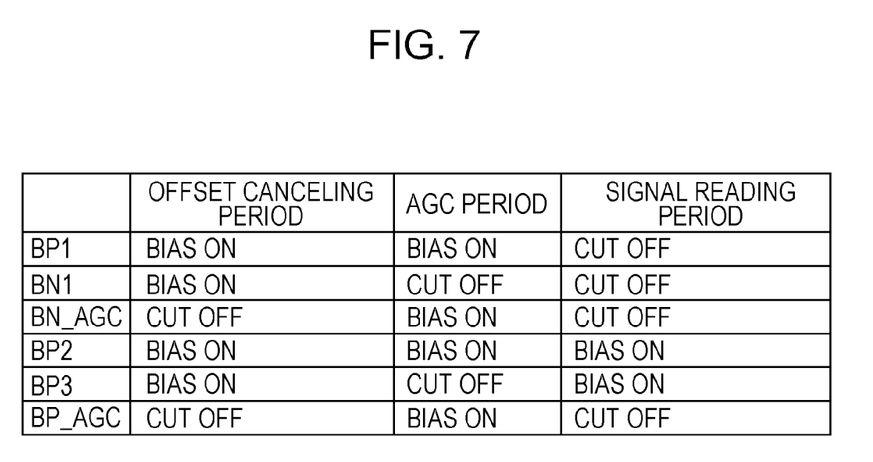
FIG. 7 is a table illustrating states of signals according to an embodiment of the present invention.

As shown in FIG. 6, the operation is divided into four periods. In the present embodiment, unlike the first embodiment described above in which the AGC period follows the reset period, an operation of an offset canceling period is performed prior to the AGC period.

First, in the reset period that starts at time T0, the signal PRES is switched to the high level to initialize the PD1 and the non-inverting input terminal of the operational amplifier 2. In the reset period, the signals BP1 to BP3, BN1, BN_AGC and BP_AGC may be in any state. However, if these signals are all in the "CUT OFF" state, a reduction in power consumption is achieved.

During the offset canceling period that starts at time T1, the signals BP1 to BP3 and BN1 are set to be in the "BIAS ON" state, while the signals BN_AGC and BP_AGC are set to be in the "CUT OFF" state.

When the signal PRES is switched to the low level at time T1, a signal corresponding to an amount of light incident on the PD1 is output from the unit pixel. On the other hand, at time T1, the signal POFC is switched to the high level to cause the output terminal of the differential amplifier circuit 4 to be electrically connected to the inverting input terminal of the differential amplifier circuit 4 so that the differential amplifier circuit 4 operates as a voltage follower.

When the signals PTN1, PTN2, and PGR are switched to the high level at time T2, the output terminal of the unit pixel 100 is electrically connected to the non-inverting input terminal of the differential amplifier circuit 4 and the output terminal of the differential amplifier circuit 4 is connected to one of electrodes of the clamping capacitor. As a result, the voltage level of the unit pixel 100 at the time immediately after the initialization plus the offset voltage of the differential amplifier circuit 4 is applied to one of terminals of the clamping capacitor 24. In this state, because the MOS transistor 25 is in the ON-state, the other one of the terminals of the clamping capacitor is connected to the power supply voltage VGR.

When the signal PTN2 is switched to the low level at time T3, the output terminal of the differential amplifier circuit 4 is electrically disconnected from the one of the electrodes of the clamping capacitor 24.

When the signal PTN1 is switched to the low level at time T4, the output terminal of the unit pixel 100 is electrically disconnected from the non-inverting input terminal of the differential amplifier circuit 4.

When the signal PTS2 is switched to the high level at time T5, the non-inverting input terminal of the differential amplifier circuit 4 is connected to the other one of the electrodes of the clamping capacitor 24 and the power supply voltage VGR whereby the voltage of the non-inverting input terminal of the differential amplifier circuit 4 and the voltage of the other one of the electrodes of the clamping capacitor 24 become equal to the power supply voltage VGR.

Subsequently, when the signal PGR is switched to the low level at time T6, the non-inverting input terminal of the differential amplifier circuit 4 and the other one of the electrodes of the clamping capacitor 24 are brought into a floating state. As a result, the voltage level of the unit pixel 100 at the time immediately after the initialization plus the offset voltage of the differential amplifier circuit 4 with respect to the VGR is held between the two terminals of the clamping capacitor 24.

Subsequently, at time T7, the offset canceling period ends and the AGC period starts. During the AGC period, the signals BP1, BP2, BN_AGC and BP_AGC are in the "BIAS ON" state, and the signals BN1 and BP3 are in the "CUT OFF" state. Thus, the constant current source in the buffer stage disposed in each of the circuit blocks 203 to 205 is provided not by the MOS transistor 47 but, instead, by the MOS transistor 10 serving as the second constant current source. Therefore, when the signal PAGC is switched to the high level at time T8, an output from a circuit block that has the greatest signal input to the control electrode of the MOS transistor 46 among all circuit blocks is obtained at the output terminal POUT of the maximum value detection unit PK. On the other hand, the constant current source in the buffer stage disposed in each of the circuit blocks 209 to 211 is provided not by the MOS transistor 67 but, instead, by the MOS transistor 11 serving as the second constant current source. Thus, an output from a circuit block that has the smallest signal input to the control electrode of the MOS transistor 66 among all circuit blocks is obtained at the output terminal BOUT of the minimum value detection unit BTM.

During the AGC period, the signal POFC is at the low level whereby the output terminal of the differential amplifier circuit 4 is electrically disconnected from the inverting input terminal of the differential amplifier circuit 4. Furthermore, the signal PTS1 is switched to the high level whereby the output terminal of the unit pixel 100 is electrically connected to the one of the terminals of the clamping capacitor 24. Thus, if the output of the unit pixel 100 changes in response to the amount of incident light, a voltage corresponding to the difference is applied to the non-inverting input terminal of the differential amplifier circuit 4. In this situation, because the MOS transistors 5 and 28 are both in the "BIAS ON" state, the non-inverting input terminal of the differential amplifier circuit 4 is virtually grounded and the potential of the common output line 8 becomes equal to the potential of the non-inverting input terminal of the differential amplifier circuit 4. This leads to a reduction in influence of a voltage drop through the MOS transistor 5. During the subsequent offset canceling period, the reset noise of the unit pixel 100 and the offset of the differential amplifier circuit 4 are clamped by the clamping capacitor 24, and thus the noise and the offset are reduced in the signals output from the circuit blocks 203 to 205 and the circuit blocks 209 to 211.

In the AGC period, the contrast of the subject is detected from the difference between maximum value signal output from the output terminal POUT and the minimum value signal output from the output terminal BOUT, and the gains of these signals are set in a predetermined period of time such that a sufficiently high contrast is obtained. The predetermined period of time may be set depending on an application, a purpose, or the like. By setting this period of time to be shorter, it is possible to reduce a time taken to change gains of signals. When the signal PAGC is switched to the low level at time T9, the AGC period ends.

During the signal reading period, signals from unit pixels are read through the output terminal BOUT in response to signals PH1, PH2, . . . , and so on supplied from the scanning circuit 13. For this purpose, only the constant current sources 61 and 67 disposed in each of the circuit blocks 209 to 211 are in the "BIAS ON" state, and the signals BP1, BN1, BN_AGC, and BP_AGC are set to be in the "CUT OFF" state whereby the MOS transistors 47 and 66 located in each of the circuit blocks 209 to 211 function as constant current sources of the buffer stages in each circuit block.

When the signal PH1 rises to the high level, the output of the OR gate 12 also rises to the high level, and thus MOS transistors 7 and 30 turn on. As a result, as in the above described first embodiment, the common output line 9 becomes equal in potential to a virtually grounded point of the differential amplifier circuit 6. This leads to a reduction of influence of a voltage drop through the MOS transistor 7 on the signal output from the output terminal BOUT. Furthermore, in the present embodiment, the provision of the offset canceling unit makes it possible to reduce the reset noise of unit pixels and the offsets of differential amplifier circuits.

As described above, the photoelectric conversion apparatus according to the present embodiment of the invention provides, in addition to the benefits achieved in the first embodiment, a benefit that influences of reset noise produced in unit pixels and offsets produced in differential amplifier circuits are reduced.

Although in the previous embodiments, signals from unit pixels are output via the minimum value detection unit, the signals may be output via the maximum value detection unit.

Third Embodiment

Figure 8:
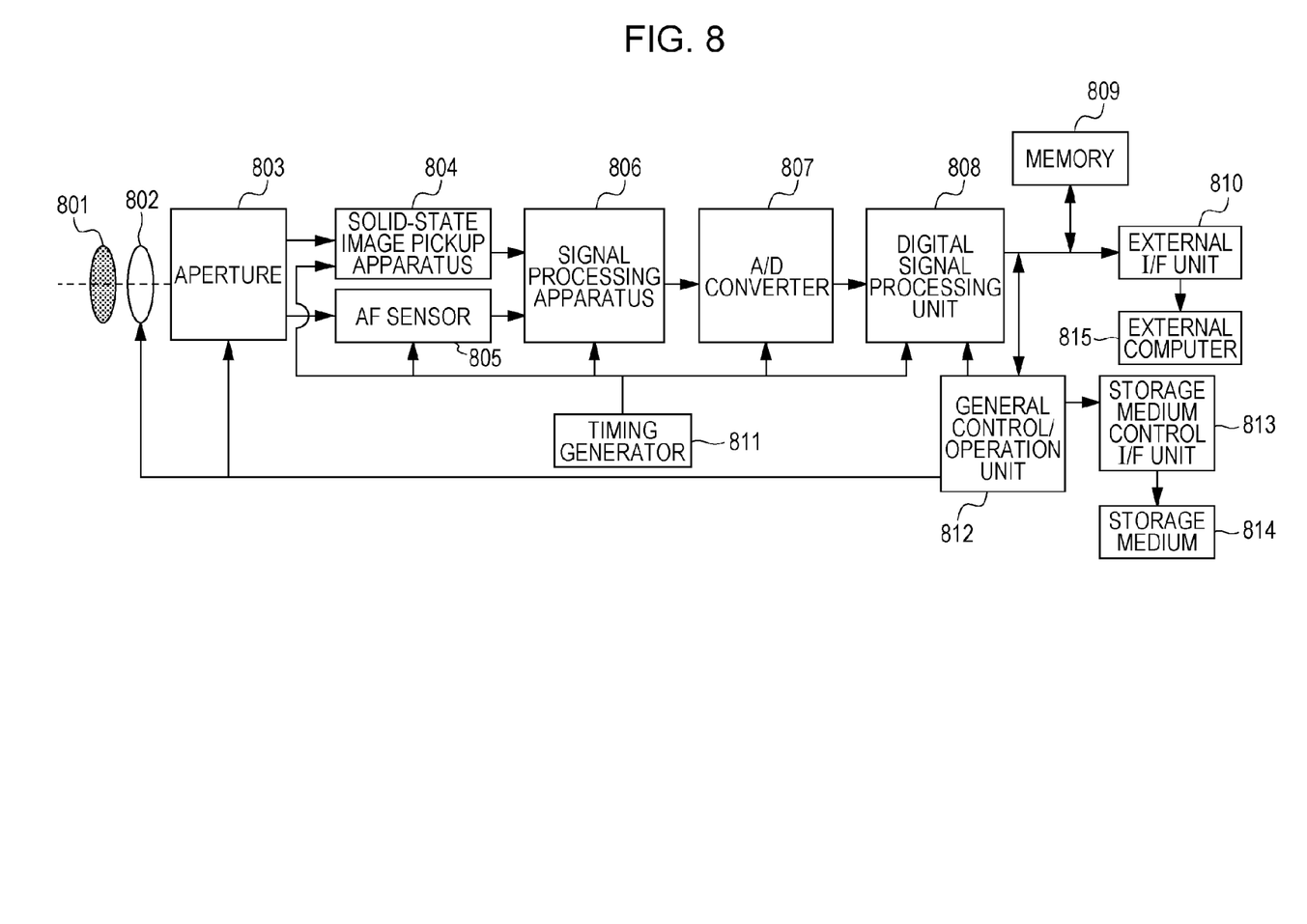
FIG. 8 is a block diagram illustrating an example of a configuration of an image pickup system according to an embodiment of the present invention.

A third embodiment of the present invention is described below with reference to FIG. 8. FIG. 8 is a block diagram illustrating an example of a configuration of an image pickup system according to the third embodiment of the present invention.

A barrier 801 protects a lens 802. The lens 802 forms an optical image of an object on a solid-state image pickup apparatus 804. An aperture 803 is used to adjust the amount of light after the light has passed through the lens 802. The solid-state image pickup apparatus 804 acquires an image signal corresponding to the optical image of the object formed by the lens. An AF sensor 805 is realized using the photoelectric conversion apparatus according to any embodiment described above.

An analog signal processing apparatus 806 processes signals output from the solid-state image pickup apparatus 804 and the AF sensor 805. An analog-to-digital converter 807 performs an analog-to-digital conversion on a signal output from the signal processing apparatus 806. A digital signal processing unit 808 performs various kinds of corrections and/or data compression on image data output from the analog-to-digital converter 807.

A memory 809 temporarily stores image data. An external apparatus I/F unit 810 serves as an interface for communicating with an external apparatus such as an external computer. A timing generator 811 outputs various timing signals to the digital signal processing unit 808 and other units. A general control/operation unit 812 performs various calculations and controls the whole camera. Reference numeral 813 denotes a storage medium control I/F unit. A storage medium 814 is a removable storage medium such as a semiconductor memory for storing and reading image data. Reference numeral 815 denotes an external computer. A focus detection apparatus may be realized using the AF sensor 805, the lens 801, the timing generator 811, and the general control/operation unit 812.

When taking an image, the image pickup system operates as follows. When the barrier 801 is opened and a signal is output from the AF sensor 805, the general control/operation unit 812 calculates the distance to an object based on the phase difference detection. Subsequently, based on the result of the calculation, the general control/operation unit 812 drives the lens 802 to try to achieve focus. A determination is then made as to whether an in-focus state is achieved. If it is determined that focus is not yet achieved, the lens 802 is again driven until focus is achieved. After focus has been achieved, the solid-state image pickup apparatus 804 starts an accumulation operation. If the accumulation operation of the solid-state image pickup apparatus 804 is completed, an image signal is output from the solid-state image pickup apparatus 804 and converted from analog form into digital form by the analog-to-digital converter 807. The resultant digital data is processed by the digital signal processing unit 808 and written in the memory 809 under the control of the general control/operation unit 812. The data stored in the memory 809 is then stored in the storage medium 814 via the storage medium control I/F unit 813 under the control of the general control/operation unit 812. The data stored in the memory 809 may be directly input to the computer or the like via the external apparatus I/F unit 810.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-285778 filed Dec. 16, 2009, which is hereby incorporated by reference herein in its entirety.

What is claimed is:

1. An apparatus comprising:
 a plurality of unit pixels each configured to output a signal generated by photoelectric conversion;
 an output line provided for the plurality of unit pixels and configured to transmit signals output from the unit pixels;
 a plurality of circuit blocks each provided for one of the unit pixels and connected between the one of the unit pixels and the output line; and
 a first constant current source configured to supply a current to the output line, wherein
 each of the circuit blocks includes a differential amplifier circuit and a first switch,
 the differential amplifier circuit includes a transistor configured to form a source follower with the first constant current source,
 the differential amplifier circuit has a non-inverting input terminal to which the signal output from a corresponding unit pixel is applied,
 a first terminal of the first switch is connected to a source of the transistor, and
 a second terminal of the first switch is directly connected to the output line, and connected to an inverting input terminal of the differential amplifier circuit.

2. The apparatus according to claim 1, wherein the differential amplifier circuit includes a differential input stage and a buffer stage.

3. The apparatus according to claim 1, further comprising a second constant current source provided for the plurality of circuit blocks,
 wherein the source follower operates with the first or the second constant current source.

4. The apparatus according to claim 1, wherein the second terminal of the first switch is connected to the inverting input terminal of the differential amplifier circuit via a second switch.

5. The apparatus according to claim 1, further comprising an offset canceling unit configured to reduce an offset produced in the circuit blocks.

6. The apparatus according to claim 5, wherein the offset canceling unit includes a clamping capacitor to clamp the offset of the differential amplifier circuit.

7. The apparatus according to claim 6, wherein
the first terminal of each of the first switches is connected to the inverting input terminal of the differential amplifier circuit via a third switch,
and wherein the third switch is in an on-state during a period in which the offset of the differential amplifier circuit is held by the clamping capacitor.

8. A focus detection apparatus including the apparatus according to claim 1 and an operation unit,
wherein the operation unit operates a calculation of a distance to an object based on a signal output from the apparatus.

9. The focus detection apparatus according to claim 8, wherein the differential amplifier circuit includes a differential input stage and a buffer stage.

10. The focus detection apparatus according to claim 8, wherein the second terminal of the first switch is connected to the inverting input terminal of the differential amplifier circuit via a second switch.

11. The focus detection apparatus according to claim 8, further comprising an offset canceling unit configured to reduce an offset produced in the circuit blocks.

12. The focus detection apparatus according to claim 11, wherein the offset canceling unit includes a clamping capacitor to clamp the offset of the differential amplifier circuit.

13. An image pickup system including the focus detection apparatus according to claim 8 and a solid-state image pickup apparatus,
wherein the solid-state image pickup apparatus starts an accumulation operation based on a result of the calculation, the result indicating an in-focus state.

14. The image pickup system according to claim 13, wherein the differential amplifier circuit includes a differential input stage and a buffer stage.

15. The image pickup system according to claim 13, wherein the second terminal of the first switch is connected to the inverting input terminal of the differential amplifier circuit via a second switch.

16. The image pickup system according to claim 13, further comprising an offset canceling unit configured to reduce an offset produced in the circuit blocks.

17. The image pickup system according to claim 16, wherein the offset canceling unit includes a clamping capacitor to clamp the offset of the differential amplifier circuit.

\* \* \* \* \*